United States Patent
Li et al.

(10) Patent No.: US 9,431,039 B1
(45) Date of Patent: Aug. 30, 2016

(54) MULTIPLE SENSOR ARRAY USABLE IN TWO-DIMENSIONAL MAGNETIC RECORDING

(71) Applicant: Western Digital (Fremont), LLC, Fremont, CA (US)

(72) Inventors: Shaoping Li, San Ramon, CA (US); Gerardo A. Bertero, Redwood City, CA (US); Ge Yi, San Ramon, CA (US); Michael L. Mallary, Sterling, MA (US); Qunwen Leng, Palo Alto, CA (US); Eric J. Champion, Longmont, CO (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 13/928,799

(22) Filed: Jun. 27, 2013

Related U.S. Application Data

(60) Provisional application No. 61/825,629, filed on May 21, 2013.

(51) Int. Cl.
| | |
|---|---|
| *G11B 5/39* | (2006.01) |
| *G11B 5/115* | (2006.01) |
| *G11B 5/29* | (2006.01) |
| *G11B 5/49* | (2006.01) |
| *G11B 5/48* | (2006.01) |

(52) U.S. Cl.
CPC ............ *G11B 5/3977* (2013.01); *G11B 5/115* (2013.01); *G11B 5/29* (2013.01); *G11B 5/3912* (2013.01); *G11B 5/3951* (2013.01); *G11B 5/4886* (2013.01); *G11B 5/4976* (2013.01)

(58) Field of Classification Search
CPC .... G11B 5/397; G11B 5/3974; G11B 5/3977
USPC ........................................................ 360/316
See application file for complete search history.

(56) References Cited

U.S. PATENT DOCUMENTS

| | | |
|---|---|---|
| 4,012,781 A | 3/1977 | Lin |
| 5,229,901 A | 7/1993 | Mallary |
| 5,270,892 A | 12/1993 | Naberhuis |
| 5,309,305 A | 5/1994 | Nepela et al. |
| 5,335,127 A * | 8/1994 | Nagata et al. ............... 360/316 |
| 5,388,014 A | 2/1995 | Brug et al. |
| 5,488,525 A * | 1/1996 | Adams et al. ............... 360/121 |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,798 A * | 11/1998 | Muller et al. ............... 360/121 |
| 5,831,888 A | 11/1998 | Glover |
| 5,963,400 A | 10/1999 | Cates et al. |

(Continued)

OTHER PUBLICATIONS

Shaoping Li, et al., U.S. Appl. No. 14/097,157, filed Dec. 4, 2013, 38 pages.

(Continued)

*Primary Examiner* — Craig A. Renner
(74) *Attorney, Agent, or Firm* — Convergent Law Group LLP

(57) ABSTRACT

A method and system provide a magnetic transducer including a first shield, a plurality of read sensors, and a second shield. The read sensors are between the first shield and the second shield. The read sensors have a plurality of widths in a track width direction and are separated by at least one distance in a down track direction. The down track direction is perpendicular to the track width direction.

26 Claims, 7 Drawing Sheets

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,362,528 B2 | 3/2002 | Anand |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |

(56) References Cited

U.S. PATENT DOCUMENTS

| | | |
|---|---|---|
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,542,321 B1 * | 4/2003 | Molstad et al. ............... 360/31 |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,756 B2 | 3/2005 | Saito et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,253 B1 | 5/2005 | Rogers et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B2 | 9/2007 | Tsuchiya |

(56) References Cited

U.S. PATENT DOCUMENTS

| | | |
|---|---|---|
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,315,072 B2 | 1/2008 | Watanabe |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,168 B2 | 5/2008 | Wu et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,868,362 B2 | 1/2011 | Randazzo et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |

(56) References Cited

U.S. PATENT DOCUMENTS

| | | |
|---|---|---|
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,384,220 B2 | 2/2013 | Saito et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |

(56) References Cited

U.S. PATENT DOCUMENTS

| | | |
|---|---|---|
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,891,207 B1* | 11/2014 | Li et al. .................. 360/316 |
| 8,908,333 B1* | 12/2014 | Rudy et al. .............. 360/319 |
| 2003/0067299 A1* | 4/2003 | Shinmura et al. ........ 324/252 |
| 2004/0021982 A1* | 2/2004 | Ozue et al. ............... 360/121 |
| 2009/0073603 A1* | 3/2009 | Koeppe .................. 360/77.12 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0286502 A1* | 10/2013 | Erden et al. ................ 360/76 |
| 2014/0154529 A1 | 6/2014 | Yang et al. |
| 2014/0175050 A1 | 6/2014 | Zhang et al. |

OTHER PUBLICATIONS

Shaoping Li, et al., U.S. Appl. No. 14/046,771, filed Oct. 4, 2013, 43 pages.

Shaoping Li, et al., U.S. Appl. No. 13/963,172, filed Aug. 9, 2013, 37 pages.

Steven C. Rudy, et al., U.S. Appl. No. 14/045,022, filed Oct. 3, 2013, 31 pages.

* cited by examiner

MULTIPLE SENSOR ARRAY USABLE IN TWO-DIMENSIONAL MAGNETIC RECORDING

CROSS-REFERENCE TO RELATED APPLICATIONS

This application claims priority to provisional U.S. Patent Application Ser. No. 61/825,629, filed on May 21, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures 16. These magnetic bias structures are used to magnetically bias the sensor layer of the sensor 14.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction but are aligned in the down track direction. The sensors are separated by a particular distance in the cross track direction. In addition, the sensors have the same length (and read track width) in the cross track direction. This length is typically not more than fifty percent of the track width. The central sensor reads the data from a track of interest, while the outer sensors sense the data in adjacent tracks in order to account for noise.

Although TDMR might be capable of higher recording densities, issues may be faced at skew. For example, in some recording applications, such as shingled recording, the skew angle changes. Near the outside diameter of the disk, the skew angle may be positive. Closer to the center of the disk (the inside diameter of the disk), the skew angle may be negative. Between the inside and outside diameters, the skew angle may be zero. For nonzero skew angle(s), some of the recording sensors may be moved so that they are misaligned with the track they are desired to sense. This is generally an issue for the outer read sensors. As a result, the transducer may not perform as desired for all skew angles. Accordingly, what is needed is a system and method for improving the performance of a magnetic recording read transducer, particular for TDMR.

DETAILED DESCRIPTION OF THE EXEMPLARY EMBODIMENTS

Figure 1:
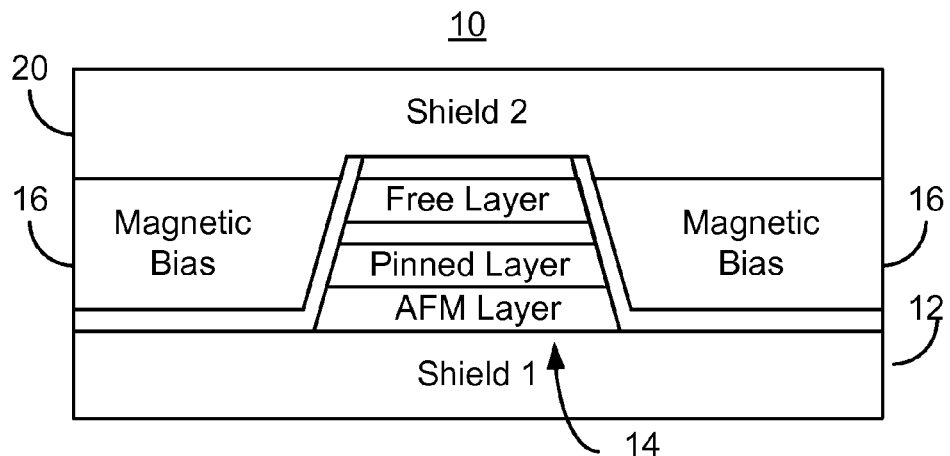
FIG. 1 depicts a conventional read transducer.
Figure 2:
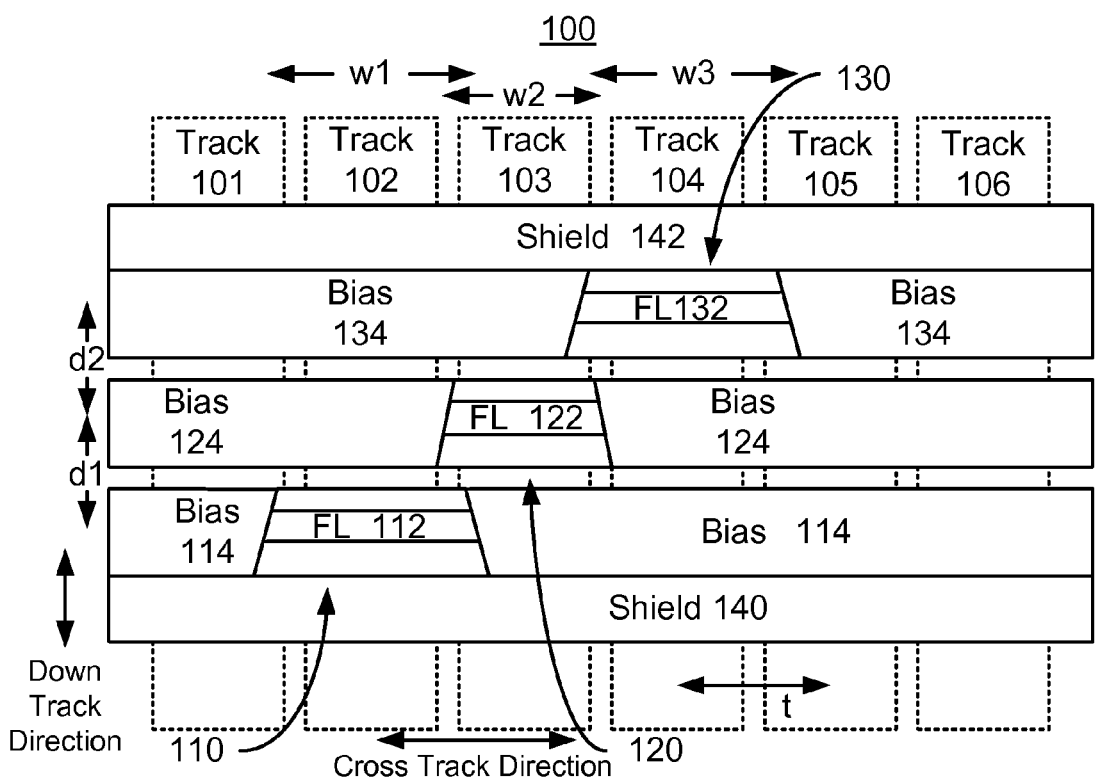
FIG. 2 depicts an exemplary embodiment of a portion of a magnetic recording read transducer.

FIG. 2 depicts an exemplary embodiment of a magnetic read transducer 100. For clarity, FIG. 2 is not to scale and not all components of the read transducer 100 are shown. The read transducer 100 may be part of a read head or may be part of a merged head that also includes a write transducer. Also shown are tracks 101, 102, 103, 104, 105 and 106 that may be part of a disk and have a track pitch, t. Although six tracks 101, 102, 103, 104, 105 and 106 are shown, another number may be present on the disk. Thus, the read transducer 100 and tracks 101-106/disk may be part of a magnetic recording disk drive. The transducer 100 includes shields 140 and 142, read sensors 110, 120 and 130 and magnetic bias structures 114, 124 and 134. The shields 140 and 142 generally include soft magnetic material. In some embodiments, one or more of the shields 190 and 192 may include ferromagnetic layers that are antiferromagnetically coupled.

The magnetic bias structure(s) 114, 124 and/or 134 may be soft bias structures fabricated with soft magnetic material(s). In other embodiments, the magnetic bias structure(s) 114, 124 and/or 134 may be hard magnetic bias structures. Other mechanisms for biasing the sensors 110, 120 and 130 might also be used.

Each of the sensors 110, 120 and 130 shown may be a GMR or TMR sensor. Thus, each sensor 110, 120 and 130 includes a pinning layer, a pinned, a nonmagnetic spacer layer and a free layer 112/122/132. For simplicity, only the free layers 112, 122 and 132 are separately labeled in FIG. 2. The sensors 110, 120 and 130 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 112, 122 and 132 are each shown as a single layer, but may include multiple layers including but not limited to a synthetic antiferromagnetic (SAF) structure. The pinned layer may also be a simple layer or a multilayer. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

The read transducer 100 includes multiple read sensors 110, 120 and 130. Although FIG. 2 depicts three read sensors 110, 120 and 130, other embodiments may include other numbers of read sensors. The read sensors 110, 120 and 130 are separated by distances d1 and d2 in a down track direction. The down track direction is perpendicular to the cross track direction. The cross track direction and track width direction are the same. In the embodiment shown in FIG. 2, the distance d1 and d2 between the sensors 110 and 120 and between the sensors 120 and 130, respectively, are the same. However, in other embodiments, the distances between the sensors 110, 120 and 130 may not be the same. The distances d1 and d2 may each be at least ten nanometers and not more than four hundred nanometers.

As can be seen in FIG. 2, the read sensors 110, 120 and 130 have multiple widths, w1, w2 and w3, respectively, in the track width direction. In the embodiment shown, the central sensor 120 has the smallest width, w1. The sensors 110 and 130 are wider. In the embodiment shown, the sensors 110 and 130 have the same width (w1=w3). However, in other embodiments, other widths are possible. The widths of the sensors 110, 130 and 130 may also be based on the track pitch. The track pitch is the distance from the center of one track to the center of the next track. The width, w2, is at least fifty and not more than one hundred twenty percent of the track pitch. In some such embodiments, the width of the sensor 120 is at least eighty percent and not more than one hundred percent of the track pitch. The width of the sensors 110 and 130 may be greater. In some embodiments, the widths w1 and w3 are at least equal to the track pitch and not more than twice the track pitch. In some such embodiments, the widths w1 and w3 are each at least one hundred twenty percent and not more than one hundred fifty percent of the track pitch. In other embodiments, the widths w1, w2 and/or w3 may be different. Further, the widths may depend not only on the track pitch, but also on the distance between the sensors 110, 120 and 130. In the embodiment shown, the width(s) of the sensors 110 and 130 increase with increasing distance from the central read sensor 120 along the cross track direction. In other embodiments, the widths of the sensors 110, 120 and 130 may vary in another manner.

The plurality of read sensors 110, 120 and 130 are displaced along the cross track direction. Therefore, the centers of each of the read sensors 110, 130 and 130 are not aligned along a vertical line that runs the down track direction. The read sensors 110, 120 and 130 may also overlap in the track width/cross track direction. In some embodiments, the read sensors 110, 120 and/or 130 overlap by at least five percent and not more than seventy percent of the widths w1, w2 and w3. In some such embodiments, the read sensors 110, 120 and/or 130 overlap by at least thirty percent and not more than forty percent of the widths w1, w2 and w3. Further, the amount of overlap may depend upon the distances d1 and d2 between the sensors 110, 120 and 130. In some embodiments, the overlap may be different. For example, the sensors 110, 120 and 130 may not overlap, but instead be spaced apart.

Figure 3:
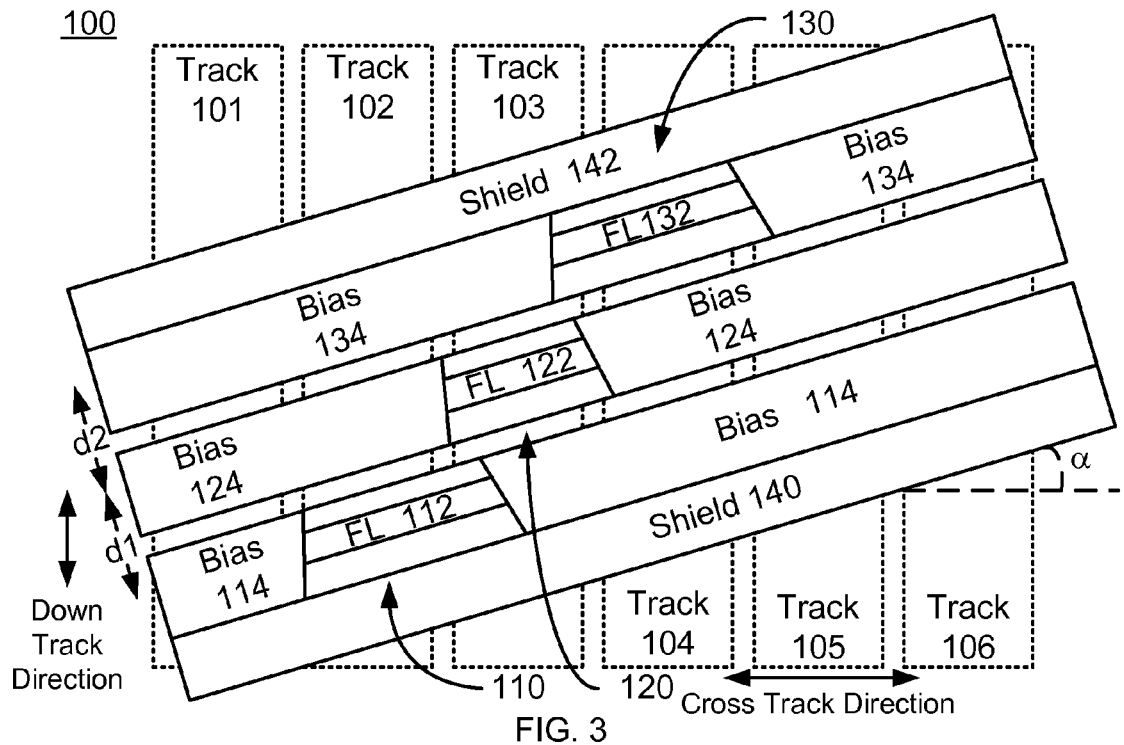
FIG. 3 depicts the exemplary embodiment of a portion of a magnetic recording read transducer at a first skew angle.
Figure 4:
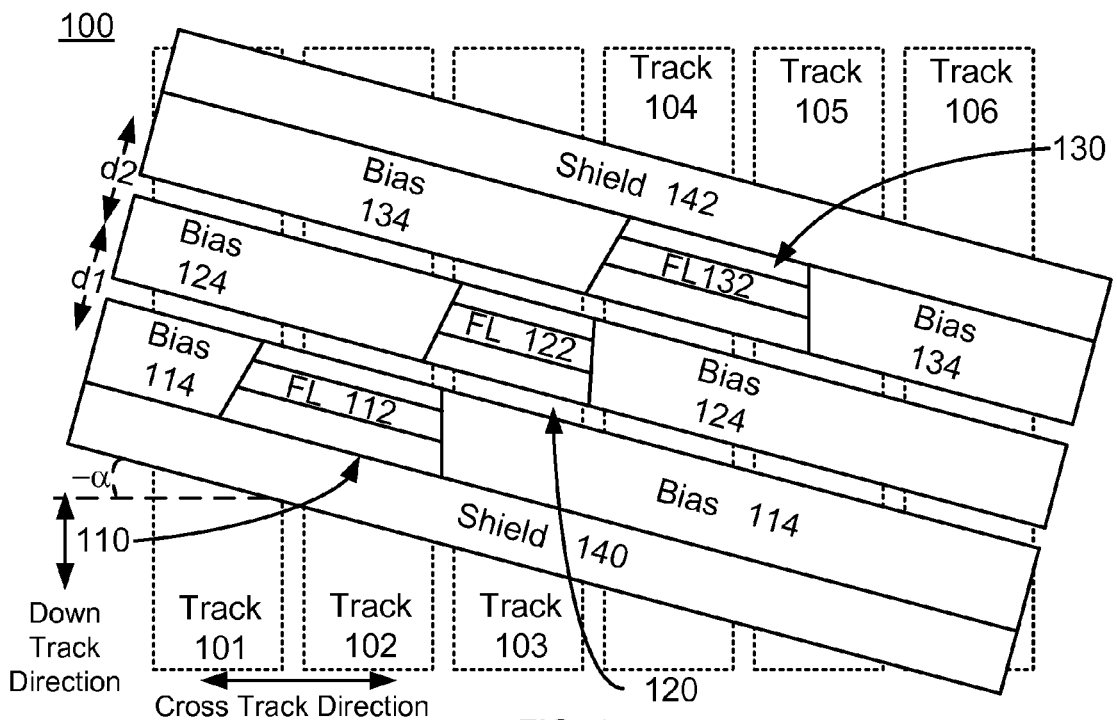
FIG. 4 depicts the exemplary embodiment of a portion of a magnetic recording read transducer at a second skew angle.

The transducer 100 may be used in higher density recording, such as TDMR. Further, the transducer 100 may address skew issues that might otherwise adversely affect performance of the transducer 100. For example, FIGS. 3 and 4 depict the transducer 100 at skew angles α and −α, respectively. FIGS. 3-4 are not to scale. Referring to FIGS. 2-4, the skew angle α for the transducer 100 may be up to fifteen degrees. In other embodiments, the maximum skew angle may be different and/or the range of skew angles may not be symmetric around a zero skew angle. As can be seen in FIGS. 2-4, the central sensor 120 remains substantially centered on the desired track 103 from skew angle −α through a zero skew angle and to a skew angle α. At a zero skew angle, the sensors 110 and 130 are centered on their tracks 102 and 104, respectively. At skew angles −α and α the sensors 110 and 130 are shifted from being centered on the tracks 102 and 104, respectively. Thus, there is some misalignment due to the skew. However, the sensors 110 and 130 are still sufficiently aligned with the tracks 102 and 104 that the sensors 110 and 130 may operate effectively. In some embodiments, at least half of the free layers 112 and 132 remain aligned with the tracks 102 and 104, respectively. Because their widths are larger than the track pitch, a greater portion of the sensors 110 and 130 are aligned with the tracks 102 and 104 at skew. The larger widths of the sensors 110 and 130 thus aid in allowing the sensors 110 and 130 remain sufficiently aligned with the tracks 102 and 104, respectively. The overlap between the sensors 110, 120 and 130 may also assist in compensating for misalignment due to skew. Because the misalignment due to skew is mitigated, the sensors 110, 120 and 130 may be better able to read data from the corresponding tracks 102, 103 and 104, respectively. In applications such as TDMR, the sensors 110 and 130 may be better able gather data for cancellation of noise from the tracks 102 and 104 adjacent to the track 103 being read. Thus, the track edge noise, the cross track noise and adjacent track interference may be reduced. Using a noise cancellation process, the width of the read sensors 110, 120 and 130 may be kept relatively large even at ultra-high track densities. Thus, reading of very high density tracks may be accomplished.

Further, the transducer 100 may be scalable. The vertical separation distances, d1 and d2 between two adjacent sensors or two free layers in two adjacent sensors may be scaled down as the shield-to-shield spacing (between shields 140 and 142) is scaled down. Thus, the arrangement of the read sensors 110, 120 and 130 may scale with the remainder of the transducer 100. For the reasons discussed above, the transducer 100 may exhibit improved performance and thus be capable of use at higher recording densities. This improved performance may be particularly beneficial for TDMR.

Figure 5:
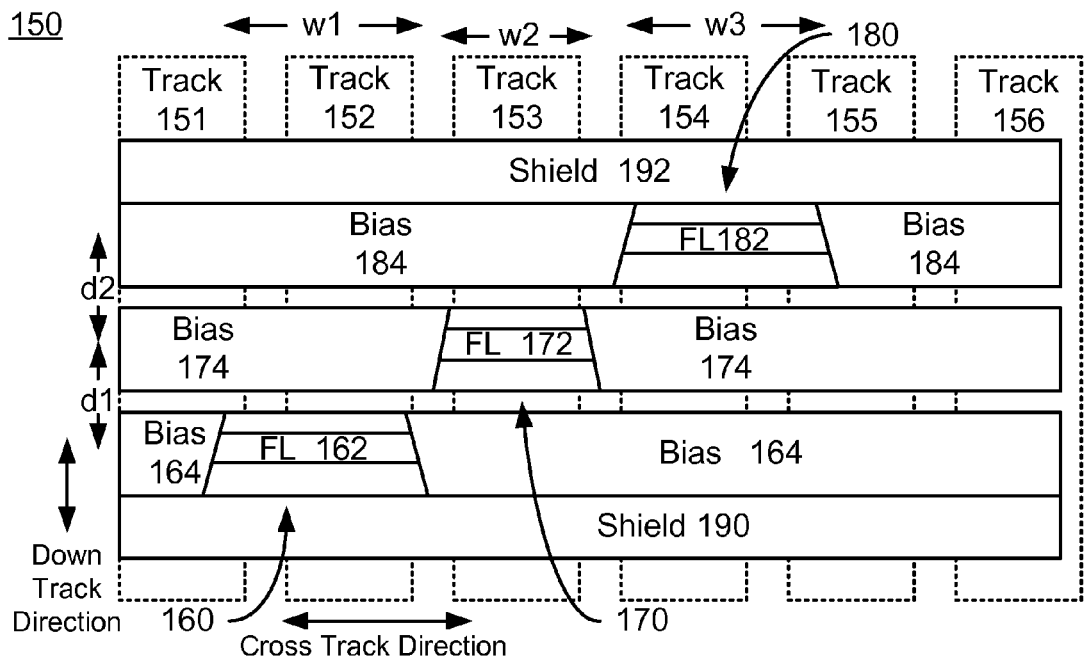
FIG. 5 depicts another exemplary embodiment of a portion of a magnetic recording read transducer.

FIG. 5 depicts another exemplary embodiment of a portion of a magnetic recording read transducer 150. For clarity, FIG. 5 is not to scale. The read transducer 150 may be part of a read head or may be part of a merged head that also includes a write transducer. Also shown are tracks 151, 152, 153, 154, 155 and 156. The transducer 150 is analogous to the transducer 100. Consequently, analogous components are labeled similarly. For example, the transducer 150 includes shields 190 and 192, sensor 160 having free layer 162, sensor 170 having free layer 172 and sensor 180 having free layer 182 that are analogous to the shields 140 and 142, sensor 110 having free layer 112, sensor 120 having free layer 122 and sensor 130 having free layer 132, respectively. The transducer 150 is also depicted as including bias structures 164, 174 and 184 that are analogous to bias structures 114, 124 and 134, respectively. Similarly, the tracks 151, 152, 153, 154, 155 and 156 that are also shown in FIG. 5 are analogous to the tracks 101, 102, 103, 104, 105 and 106.

FIG. 5 depicts three read sensors 160, 170 and 180, though other embodiments may include other numbers of read sensors. The read sensors 160, 170 and 180 are separated by distances d1 and d2 in a down track direction in an analogous manner that the read sensors 110, 120 and 130 are separated by distance d1 and d2. The distances d1 and d2 may be at least ten nanometers and not more than four hundred nanometers. The read sensors 160, 170 and 180 have multiple widths, w1, w2 and w3, respectively, in the track width direction. Thus, the widths of the read sensors 160, 170 and 180 are analogous to those of the read sensors 110, 120 and 130, respectively. The plurality of read sensors 160, 170 and 180 are displaced in the cross track direction. Further, in the embodiment shown, the read sensors 160, 170 and 180 do not overlap.

The transducer 150 may share the benefits of the transducer 100. For example, the transducer 150 may be used in higher density recording, such as TDMR. Further, the transducer 150 may address skew issues that might otherwise adversely affect performance of the transducer 150. The transducer 150 may also be scalable. For the reasons discussed above, the transducer 150 may exhibit improved performance and thus be capable of use at higher recording densities.

Figure 6:
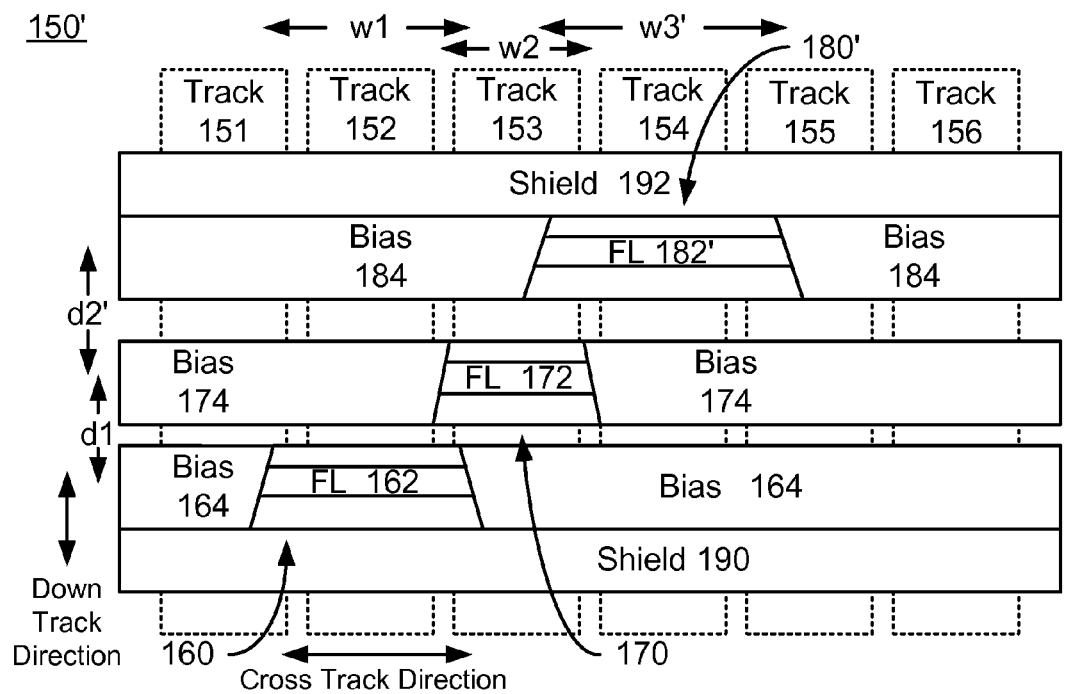
FIG. 6 depicts another exemplary embodiment of a portion of a magnetic recording read transducer.

FIG. 6 depicts another exemplary embodiment of a portion of a magnetic recording read transducer 150'. For clarity, FIG. 6 is not to scale. The read transducer 150' may be part of a read head or may be part of a merged head that also includes a write transducer. Also shown are tracks 151, 152, 153, 154, 155 and 156. The transducer 150' is analogous to the transducers 100 and 150. Consequently, analogous components are labeled similarly. For example, the transducer 150' includes shields 190 and 192, sensor 160 having free layer 162, sensor 170 having free layer 172 and sensor 180 having free layer 182 that are analogous to the shields 140/190 and 142/192, sensor 110/160 having free layer 112/162, sensor 120/170 having free layer 122/172 and sensor 130/180 having free layer 132/182, respectively, that are shown in FIGS. 2-5. The transducer 150' is also depicted as including bias structures 164, 174 and 184 that are analogous to bias structures 114/164, 124/174 and 134/184, respectively, shown in FIGS. 2-5. Similarly, the tracks 151, 152, 153, 154, 155 and 156 that are also shown in FIG. 6 are analogous to the tracks 101/151, 102/152, 103/153, 104/154, 105/155 and 106/156 depicted in FIGS. 2-5.

FIG. 6 depicts three read sensors 160, 170 and 180', though other embodiments may include other numbers of read sensors. The read sensors 160, 170 and 180' are separated by distances d1 and d2' in a down track direction in an analogous manner that the read sensors 110/160, 120/170 and 130/180 are separated by distance d1 and d2. However, in the read transducer 150', the distance d1 differs from the distance d2'. In the embodiment shown, d1 is less than d2', but the opposite may hold true. The distances d1 and d2 may each be at least ten nanometers and not more than four hundred nanometers. The plurality of read sensors 160, 170 and 180 are displaced in the track width direction. In the embodiment shown, the read sensors 160, 170 and 180' overlap. In some such embodiments, the read sensors 160, 170 and/or 180' overlap by at least thirty percent and not more than forty percent of the widths w1, w2 and w3'. Further, the amount of overlap may depend upon the distances d1 and d2 between the sensors 160, 170 and 180.

The read sensors 160, 170 and 180' have multiple widths, w1, w2 and w3', respectively, in the track width direction. Thus, the widths of the read sensors 160, 170 and 180' are analogous to those of the read sensors 110/180, 120/170 and 130/180, respectively. Note, however, that the width w3' of the sensor 180' is different than that of the read sensor 160 even though the sensors are offset from the center of the central sensor 170 by substantially the same distance. In the embodiment shown, both sensors 160 and 180' are still wider than the central sensor 170 and thus may be better able to account for skew induced misalignments. However, in other embodiments, the sensors 160, 170 and 180' may have different relationships between their widths.

The transducer 150' may share the benefits of the transducer 100 and/or 150. For example, the transducer 150' may be used in higher density recording, such as TDMR. Further, the transducer 150' may address skew issues that might otherwise adversely affect performance of the transducer 150'. The transducer 150' may also be scalable. The transducer 150' may exhibit improved performance and thus be capable of use at higher recording densities.

Figure 7:
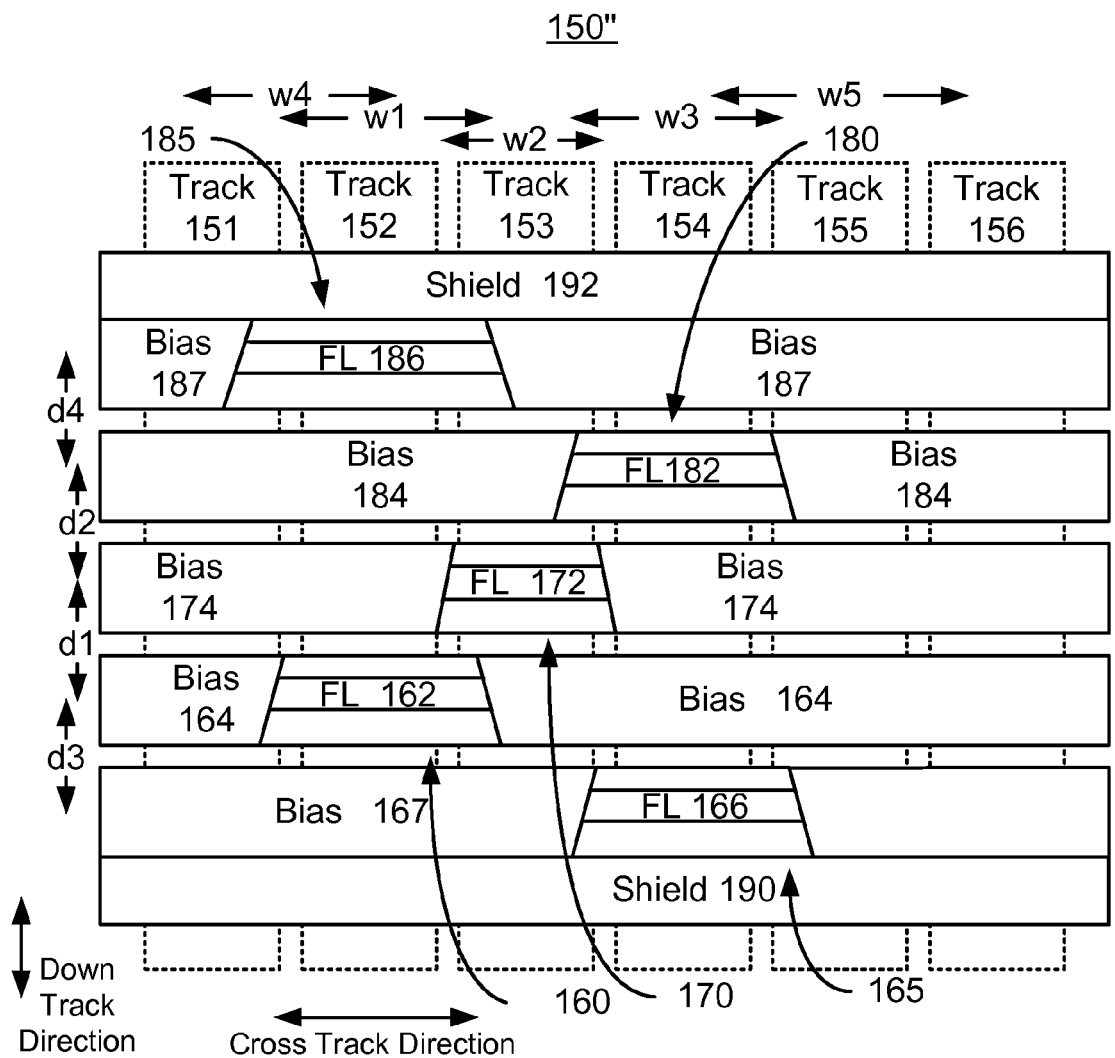
FIG. 7 depicts another exemplary embodiment of a portion of a magnetic recording read transducer.

FIG. 7 depicts another exemplary embodiment of a portion of a magnetic recording read transducer 150". For clarity, FIG. 7 is not to scale. The read transducer 150" may be part of a read head or may be part of a merged head that also includes a write transducer. Also shown are tracks 151, 152, 153, 154, 155 and 156. The transducer 150" is analogous to the transducers 100, 150 and 150'. Consequently, analogous components are labeled similarly. For example, the transducer 150" includes shields 190 and 192, sensor 160 having free layer 162, sensor 170 having free layer 172 and sensor 180 having free layer 182 that are analogous to the shields 140/190 and 142/192, sensor 110/160 having free layer 112/162, sensor 120/170 having free layer 122/172 and sensor 130/180/180' having free layer 132/182, respectively, that are shown in FIGS. 2-6. The transducer 150' is also depicted as including bias structures 164, 174 and 184 that are analogous to bias structures 114/164, 124/174 and 134/184, respectively, shown in FIGS. 2-6. Similarly, the tracks 151, 152, 153, 154, 155 and 156 that are also shown in FIG. 7 are analogous to the tracks 101/151, 102/152, 103/153, 104/154, 105/155 and 106/156 depicted in FIGS. 2-6.

FIG. 7 depicts three read sensors 160, 170 and 180 that are analogous to the read sensors described above. In addition, the transducer 150" includes additional read sensors 165 and 185 having free layers 166 and 186, respectively. The read sensors 165 and 185 are analogous to the read sensors 110/160, 120/170 and 130/180/180'. Also shown are magnetic bias structures 167 and 187 that are analogous to bias structures 114/164, 124/174 and 134/184. The read sensors 160, 170 and 180 are separated by distances d1 and d2 in a down track direction in an analogous manner that the read sensors 110/160, 120/170 and 130/180/180' are separated by distance d1 and d2/d2'. Further, the read sensors 165 and 185 are separated from the sensors 160 and 180, respectively, by distances d3 and d4, respectively. The distances d1, d2, d3 and d4 may be the same or may differ. In some embodiments, the distances d1, d2, d3 and d4 may each be at least ten nanometers and not more than four hundred nanometers. Note that the sensors 160, 165, 180 and 185 are arranged substantially symmetrically around the central sensor 170. In the embodiment shown, there are two read sensors 160 and 185 and two read sensors 180 and 165 centered on tracks 152 and 154, respectively. Thus, two sensors are centered on the tracks adjacent to the track 153 being read. However, in another embodiment, the read sensors 185 and 165 may be further from the central track 153. For example, the read sensors 165 and 185 may be centered on the tracks 151 or 155. Further, the arrangement of sensors may be asymmetric in other embodiments. Further, another number of sensors may be used. For example, one of the sensors 165 or 185 may be omitted and/or additional sensors may be used.

The read sensors 160, 170, 180, 165 and 185 are displaced in the track width direction. In the embodiment shown, the read sensors 160, 170, 180, 165 and 185 overlap. In some such embodiments, the read sensors 160, 170 and/or 180' overlap by at least thirty percent and not more than forty percent of the widths w1, w2, w3, w4 and w5. Further, the amount of overlap may depend upon the distances d1, d2, d3 and d4 between the sensors 160, 170, 180, 165 and 185. In addition, the amount that one sensor 160, 170, 180, 165 and 185 overlaps another sensor 160, 170, 180, 165 and 185 may vary.

The read sensors 160, 170, 180, 165 and 185 have multiple widths, w1, w2, w3, w4 and w5, respectively, in the track width direction. Thus, the widths of the read sensors 160, 170, 180, 165 and 185 are analogous to those of the read sensors 110/180, 120/170 and 130/180, respectively. Note, however, that the width w4 of the sensor 165 is the same as that of the sensor 160 and different from that of the sensor 185. Thus, although the widths may increase with increasing offset from the central sensor 170 in the cross track direction, in some embodiments this is not the case. In the embodiment shown, the sensors 160, 180, 165 and 185 are still wider than the central sensor 170 and thus may be better able to account for skew induced misalignments. However, in other embodiments, the sensors 160, 170, 180, 165 and 185 may have different relationships between their widths.

The transducer 150" may share the benefits of the transducer 100, 150 and/or 150'. For example, the transducer 150" may be used in higher density recording, such as TDMR. Further, the transducer 150" may address skew issues that might otherwise adversely affect performance of the transducer 150". The transducer 150" may also be scalable. The transducer 150" may exhibit improved performance and thus be capable of use at higher recording densities.

Figure 8:
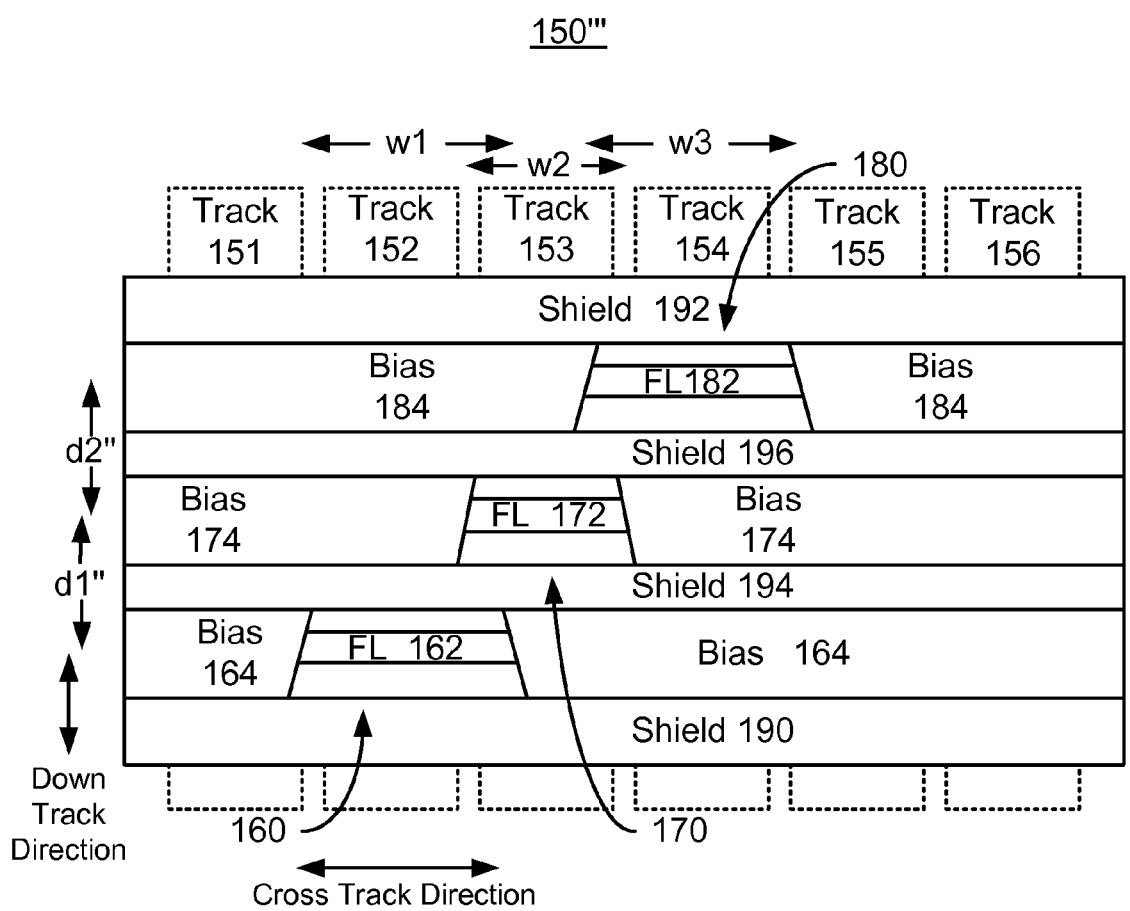
FIG. 8 depicts another exemplary embodiment of a portion of a magnetic recording read transducer.

FIG. 8 depicts another exemplary embodiment of a portion of a magnetic recording read transducer 150'''. For clarity, FIG. 8 is not to scale. The read transducer 150''' may be part of a read head or may be part of a merged head that also includes a write transducer. Also shown are tracks 151, 152, 153, 154, 155 and 156. The transducer 150''' is analogous to the transducers 100, 150, 150' and 150". Consequently, analogous components are labeled similarly. For example, the transducer 150''' includes shields 190 and 192, sensor 160 having free layer 162, sensor 170 having free layer 172 and sensor 180 having free layer 182 that are analogous to the shields 140/190 and 142/192, sensor 110/160 having free layer 112/162, sensor 120/170 having free layer 122/172 and sensor 130/180 having free layer 132/182, respectively, that are shown in FIGS. 2-7. The transducer 150''' is also depicted as including bias structures 164, 174 and 184 that are analogous to bias structures 114/164, 124/174 and 134/184, respectively, shown in FIGS. 2-7. Similarly, the tracks 151, 152, 153, 154, 155 and 156 that are also shown in FIG. 8 are analogous to the tracks 101/151, 102/152, 103/153, 104/154, 105/155 and 106/156 depicted in FIGS. 2-7.

FIG. 8 depicts three read sensors 160, 170 and 180, though other embodiments may include other numbers of read sensors. The read sensors 160, 170 and 180' are separated by distances d1" and d2" in a down track direction in an analogous manner that the read sensors 110/160, 120/170 and 130/180 are separated by distance d1 and d2. The arrangement and widths of the read sensors 160, 170 and 180 shown in FIG. 8 is also analogous to those shown in FIGS. 2-7.

In the transducer depicted in FIG. 8, however, shields 194 and 196 separate the read sensors 160 and 170 and the read sensors 170 and 180, respectively. The shields 194 and 196 are analogous to the shields 190 and 192. In some embodiments, however, the shields 194 and 196 may have insulating layers therein such that the sensors 160, 170 and 180 may be electrically isolated.

The transducer 150''' may share the benefits of the transducer 100, 150, 150' and/or 150". For example, the transducer 150''' may be used in higher density recording, such as TDMR. The transducer 150''' may also address skew issues that might otherwise adversely affect performance of the transducer 150'''. The transducer 150''' may be scalable. In addition, the ability of the sensors 160, 170 and 180 to read the desired data from the tracks 152, 153 and 154, respectively, may be enhanced by the presence of shields 194 and 196. The transducer 150''' may exhibit improved performance and thus be capable of use at higher recording densities. Various characteristics of the exemplary embodiments are emphasized in the discussion of the transducers 100, 150, 150', 150" and 150'''. However, one or more of the features of the transducers 100, 150, 150', 150" and/or 150''' may be combined in other embodiments.

Figure 9:
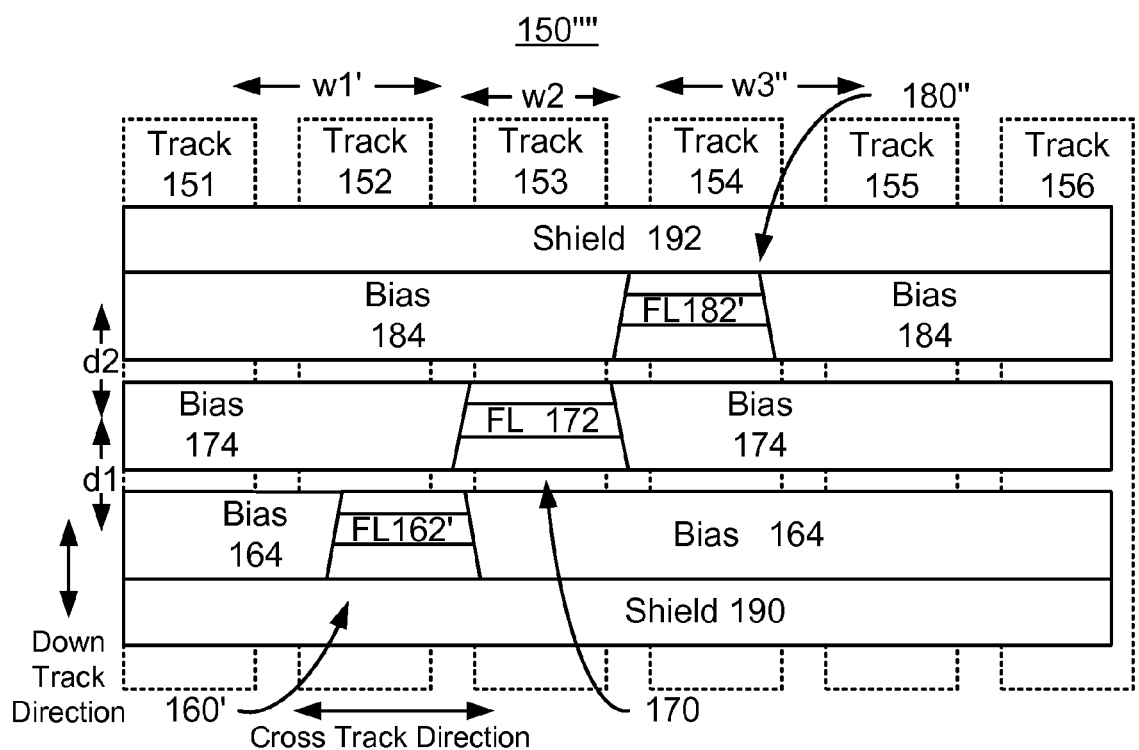
FIG. 9 depicts another exemplary embodiment of a portion of a magnetic recording read transducer.

FIG. 9 depicts another exemplary embodiment of a portion of a magnetic recording read transducer 150''''. For clarity, FIG. 9 is not to scale. The read transducer 150'''' may be part of a read head or may be part of a merged head that also includes a write transducer. Also shown are tracks 151, 152, 153, 154, 155 and 156. The transducer 150'''' is analogous to the transducers 100, 150, 150', 150" and 150'''. Consequently, analogous components are labeled similarly. For example, the transducer 150'''' includes shields 190 and 192, sensor 160' having free layer 162', sensor 170 having free layer 172 and sensor 180" having free layer 182"182' that are analogous to the shields 140/190 and 142/192, sensor 110/160 having free layer 112/162, sensor 120/170 having free layer 122/172 and sensor 130/180/180' having free layer 132/182, respectively, that are shown in FIGS. 2-8. The transducer 150'''' is also depicted as including bias structures 164, 174 and 184 that are analogous to bias structures 114/164, 124/174 and 134/184, respectively, shown in FIGS. 2-8. Similarly, the tracks 151, 152, 153, 154, 155 and 156 that are also shown in FIG. 9 are analogous to the tracks 101/151, 102/152, 103/153, 104/154, 105/155 and 106/156 depicted in FIGS. 2-8.

FIG. 9 depicts three read sensors 160', 170 and 180", though other embodiments may include other numbers of read sensors. The read sensors 160', 170 and 180" are separated by distances d1 and d2 in a down track direction in an analogous manner that the read sensors 110, 120 and 130 are separated by distance d1 and d2. The distances d1 and d2 may be at least ten nanometers and not more than four hundred nanometers. The read sensors 160', 170 and 180" have multiple widths, w1', w2 and w3", respectively, in the track width direction. Thus, the widths of the read sensors 160', 170 and 180" are analogous to those of the read sensors 110/160, 120/170 and 130/180/180', respectively. The plurality of read sensors 160', 170 and 180" are displaced in the cross track direction. Further, in the embodiment shown, the read sensors 160', 170 and 180" overlap. In addition, the widths w1' and w3" may be less than the width of the central sensor 170. In embodiments in which the sensors 160', 170 and 180" overlap, the widths w1' and w3' may be less than or equal to the width w2 of the central sensor 170. The widths w1' and w3' may also be less than the track pitch. In addition, the sensors 160' and 180" may not be centered on the corresponding tracks 152 and 154, respectively.

The transducer 150'''' may share the benefits of the transducer 100, 150, 150', 150" and/or 150'''. For example, the transducer 150'''' may be used in higher density recording, such as TDMR. The transducer 150'''' may address skew issues that might otherwise adversely affect performance of the transducer 150''''. The transducer 150'''' may also be scalable. Further, the transducer 150''' may provide improved noise reduction. Because the widths w1' and w3" are less than or, in some embodiments, equal to the width of the central sensor 170, the outer sensors 160' and 180" may take better account of noise due to the tracks 152 and 154 adjacent to the track 153 being read. Stated differently, data from other tracks 151 and 155 may not be read by the sensors 160' and 180". Instead, only data from the adjacent tracks 152 and 154 may be read by the sensors 160' and 180" and used in noise reduction. Thus, the transducer 150'''' may be better able to account for noise due to adjacent tracks. For the reasons discussed above, the transducer 150'''' may exhibit improved performance and thus be capable of use at higher recording densities.

Figure 10:
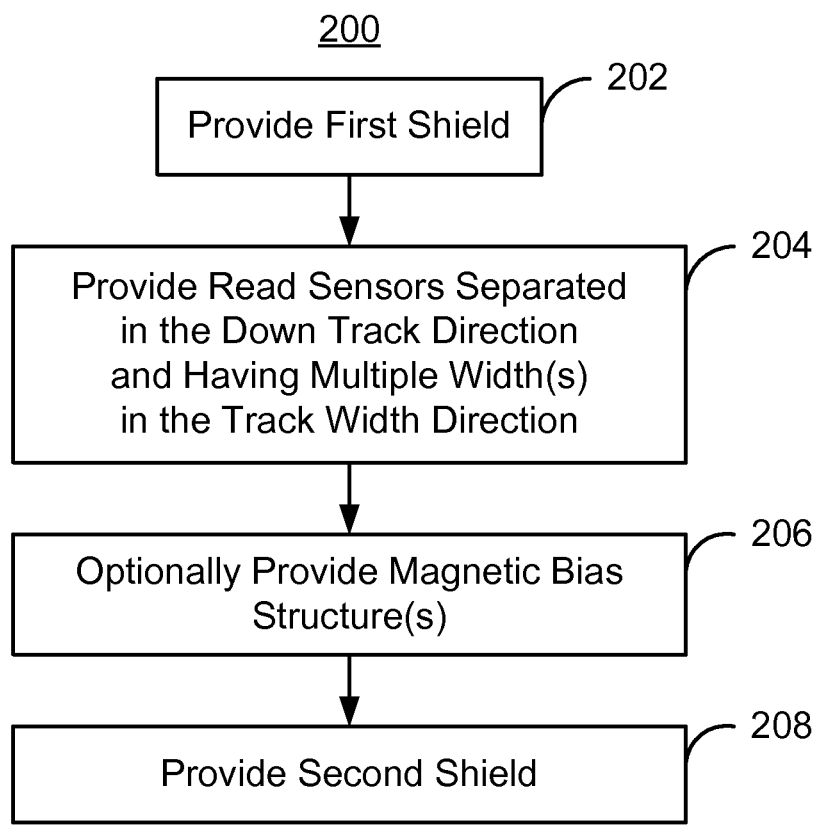
FIG. 10 is flow chart depicting an exemplary embodiment of a method for fabricating a magnetic recording read transducer.

FIG. 10 is an exemplary embodiment of a method 200 for providing a read transducer including multiple read sensors having different widths. For simplicity, some steps may be omitted, interleaved, and/or combined. The method 200 is also described in the context of providing a single recording transducer 100 depicted in FIGS. 2-4. However, the method 200 may be used to fabricate multiple transducers at substantially the same time. The method 200 may also be used to fabricate other transducers including but not limited to any combination of 150, 150', 150" and/or 150'''. The method 200 is also described in the context of particular layers. A particular layer may include multiple materials and/or multiple sub-layers. The method 200 also may start after formation of other portions of the magnetic recording transducer.

The first shield 140 is provided, via step 202. Step 202 typically includes depositing a large high permeability layer. The read sensors 100, 120, and 130 are provided, via step 204. Step 204 includes depositing the layers for each sensor 110, 120 and 130 and defining each sensor 110, 120 and 130 in at least the track width direction using an ion mill. In some embodiments, the free layer 112, 122 and 132 and the pinned layer of the sensors 110, 120 and 130 are also defined in the stripe height direction. In some embodiments, the shields 194 and 196 may be provided in connection with step 204.

The magnetic bias structures 114, 124 and 134 may optionally be provided, via step 206. Step 206 may thus include depositing the material(s) each magnetic bias structures 114, 124 and 134 and defining the magnetic bias structures 114, 124 and 134 in the track width and stripe height direction. In some embodiments, portions of steps 204 and 206 are interleaved. For example, the layers for the sensor 110 may be deposited and the sensor 110 defined in at least the stripe height direction as part of step 204. The magnetic bias structure 114 may then be formed as port of step 206. The layers for the sensor 120 may later be deposited and the sensor 120 defined in at least the stripe height direction as part of step 204. The magnetic bias structure 124 may then be formed as port of step 206. After formation of the magnetic bias structure 124, the layers for the sensor 130 may be deposited and the sensor 130 defined in at least the stripe height direction as part of step 204. The magnetic bias structure 134 may then be formed as port of step 206. Further, in some embodiments, one or more of the magnetic bias structures 114, 124 and 134 are provided such that they may be magnetically coupled to the shield 140 and/or 142.

The shield 142 is provided in step 208. Step 208 may include forming a shield having ferromagnetic layers which are antiferromagnetically coupled. In other embodiments, other multilayers or a single layer may be formed. Thus, the benefits of the magnetic transducer(s) 100, 150, 150', 150" and/or 150''' may be achieved.

We claim:

1. A magnetic read transducer having an air-bearing surface (ABS) and comprising:
    a first shield;
    a plurality of read sensors having a plurality of widths in a track width direction, the plurality of read sensors being separated by at least one distance in a down track direction and displaced in the track width direction such that none of the plurality of read sensors are aligned in the track width direction, the down track direction being perpendicular to the track width direction, the plurality of read sensors including a central read sensor having a first width of the plurality of widths, a remaining portion of the plurality of widths being based on a distance in the track width direction between each of a remaining portion of the plurality of read sensors and the central read sensor, the remaining portion of the plurality of read sensors including at least two read sensors; and
    a second shield, the plurality of read sensors residing between the first shield and the second shield;
    wherein the magnetic transducer is oriented at a plurality of skew angles from the down track direction with respect to a portion of a plurality of tracks on a media, the plurality of skew angles having an absolute value of up to a maximum skew angle, the maximum skew angle being nonzero, the at least one distance being configured such that at the plurality of skew angles neighboring read sensors of the plurality of read sensors are aligned with adjoining tracks of the plurality of tracks.

2. The magnetic transducer of claim 1 wherein the plurality of read sensors overlap in the down track direction.

3. The magnetic read transducer of claim 2 wherein the plurality of read sensors overlap by at least five percent and not more than seventy percent of the plurality of widths.

4. The magnetic read transducer of claim 3 wherein the plurality of read sensors overlap by at least thirty percent and not more than forty percent of the plurality of widths.

5. The magnetic read transducer of claim 1 wherein the remaining portion of the plurality of widths is smaller than the first width.

6. The magnetic read transducer of claim 1 further comprising:
    a plurality of shields interleaved with the plurality of read sensors.

7. The magnetic read transducer of claim 1 wherein each of the plurality of sensors includes a free layer, wherein the at least one distance is measured between the free layer of a sensor of the plurality of sensors to the free layer of a nearest sensor of the plurality of sensors, the at least one distance being at least ten nanometers and not more than four hundred nanometers.

8. The magnetic read transducer of claim 1 wherein none of the plurality of read sensors are aligned in the down track direction.

9. A magnetic read transducer having an air-bearing surface (ABS) and comprising:
    a first shield;
    a plurality of read sensors having a plurality of widths in a track width direction, the plurality of read sensors being separated by at least one distance in a down track direction, the down track direction being perpendicular to the track width direction; and
    a second shield, the plurality of read sensors residing between the first shield and the second shield;

wherein the plurality of read sensors include a central read sensor having a first width of the plurality of widths, a remaining portion of the plurality of widths being not smaller than the first width.

10. The magnetic read transducer of claim 9 wherein the remaining portion of the plurality of widths increase with increasing distance from the central read sensor.

11. The magnetic read transducer of claim 9 wherein the plurality of read sensors are configured to read a media including a plurality of tracks having a track pitch and wherein the remaining portion of the plurality of widths are at least equal to and not more than twice the track pitch.

12. The magnetic read transducer of claim 11 wherein the remaining portion of the plurality of widths is at least one hundred twenty percent and not more than one hundred fifty percent of the track pitch.

13. The magnetic read transducer of claim 11 wherein the first width is at least fifty and not more than one hundred twenty percent of the track pitch.

14. The magnetic read transducer of claim 13 wherein the first width is at least eighty percent and not more than one hundred percent of the track pitch.

15. A disk drive comprising:
a media including a plurality of tracks;
a slider including a magnetic read transducer having an air-bearing surface (ABS), the magnetic read transducer including a first shield, a plurality of read sensors and a second shield, the plurality of read sensors having a plurality of widths in a track width direction, the plurality of read sensors being separated by at least one distance in a down track direction and displaced in the track width direction such that none of the plurality of read sensors are aligned in the track width direction, the down track direction being perpendicular to the track width direction, the plurality of read sensors including a central read sensor having a first width of the plurality of widths, a remaining portion of the plurality of widths being based on a distance in the track width direction between each of a remaining portion of the plurality of read sensors and the central read sensor, the remaining portion of the plurality of read sensors including at least two read sensors, the slider being oriented at a plurality of skew angles from the down track direction with respect to a portion of the plurality of tracks, the plurality of skew angles having an absolute value of up to a maximum skew angle, the maximum skew angle being nonzero, the at least one distance being configured such that at the plurality of skew angles neighboring read sensors of the plurality of read sensors are aligned with adjoining tracks of the plurality of tracks.

16. The disk drive of claim 15 wherein none of the plurality of read sensors are aligned in the down track direction.

17. A method for providing a magnetic read transducer having an air-bearing surface (ABS) comprising:
providing a first shield;
providing a plurality of read sensors having a plurality of widths in a track width direction, the plurality of read sensors being separated by at least one distance in a down track direction and displaced in the track width direction such that none of the plurality of read sensors are aligned in the track width direction, the down track direction being perpendicular to the track width direction, the plurality of read sensors including a central read sensor having a first width of the plurality of widths, a remaining portion of the plurality of widths being based on a distance in the track width direction between each of a remaining portion of the plurality of read sensors and the central read sensor, the remaining portion of the plurality of read sensors including at least two read sensors; and
providing a second shield, the plurality of read sensors residing between the first shield and the second shield;
wherein the magnetic transducer is configured to be oriented at a plurality of skew angles from the down track direction with respect to a portion of a plurality of tracks on a media, the plurality of skew angles having an absolute value of up to a maximum skew angle, the maximum skew angle being nonzero, the at least one distance being configured such that at the plurality of skew angles neighboring read sensors of the plurality of read sensors are aligned with adjoining tracks of the plurality of tracks.

18. The method of claim 17 wherein the plurality of read sensors overlap in the down track direction, the plurality of read sensors overlapping by at least five percent and not more than seventy percent of the plurality of widths.

19. The method of claim 17 wherein the remaining portion of the plurality of widths is smaller than the first width.

20. The method of claim 17 further comprising:
providing a plurality of shields interleaved with the plurality of read sensors.

21. The method of claim 17 wherein each of the plurality of sensors includes a free layer, wherein the at least one distance is measured between the free layer of a sensor of the plurality of sensors to the free layer of a nearest sensor of the plurality of sensors, the at least one distance being at least ten nanometers and not more than four hundred nanometers.

22. The method of claim 17 wherein none of the plurality of read sensors are aligned in the down track direction.

23. A method for providing a magnetic read transducer having an air-bearing surface (ABS) comprising:
providing a first shield;
providing a plurality of read sensors having a plurality of widths in a track width direction, the plurality of read sensors being separated by at least one distance in a down track direction, the down track direction being perpendicular to the track width direction; and
providing a second shield, the plurality of read sensors residing between the first shield and the second shield;
wherein the plurality of read sensors include a central read sensor having a first width of the plurality of widths, a remaining portion of the plurality of widths being not smaller than the first width.

24. The method of claim 23 wherein the remaining portion of the plurality of widths increase with increasing distance from the central read sensor.

25. The method of claim 24 wherein the plurality of read sensors are configured to read a media including a plurality of tracks having a track pitch and wherein the remaining portion of the plurality of widths are at least one hundred twenty percent and not more than one hundred fifty percent of the track pitch.

26. The method of claim 25 wherein the first width is at least eighty and not more than one hundred percent of the track pitch.

* * * * *